(12) United States Patent
Gregory, Jr.

(10) Patent No.: US 7,938,153 B1
(45) Date of Patent: May 10, 2011

(54) SHEAR ATTACHMENT

(76) Inventor: Warren D. Gregory, Jr., Sidney, IA (US)

( * ) Notice: Subject to any disclaimer, the term of this patent is extended or adjusted under 35 U.S.C. 154(b) by 1171 days.

(21) Appl. No.: 11/410,760

(22) Filed: Apr. 25, 2006

Related U.S. Application Data

(63) Continuation-in-part of application No. 10/774,740, filed on Feb. 9, 2004, now abandoned.

(51) Int. Cl.
*A01G 23/08* (2006.01)

(52) U.S. Cl. ............... 144/4.1; 144/24.13; 144/34.5

(58) Field of Classification Search ............ 144/34.5, 144/34.1, 24.13, 336, 339, 4.1, 1.4; 30/134, 30/267; 83/928
See application file for complete search history.

(56) References Cited

U.S. PATENT DOCUMENTS

| | | | | |
|---|---|---|---|---|
| 2,955,631 | A * | 10/1960 | Hoadley | 144/34.5 |
| 3,196,911 | A * | 7/1965 | Busch et al. | 144/34.2 |
| 3,327,745 | A * | 6/1967 | Meece et al. | 144/34.1 |
| 3,348,592 | A * | 10/1967 | Winblad et al. | 144/4.1 |
| 3,482,614 | A * | 12/1969 | Griffin et al. | 144/34.1 |
| 3,550,655 | A * | 12/1970 | Murphy | 144/34.5 |
| 3,580,310 | A * | 5/1971 | Frankenberg et al. | 144/4.1 |
| 3,665,985 | A * | 5/1972 | White | 144/34.5 |
| 3,885,610 | A * | 5/1975 | Forslund et al. | 144/4.1 |
| 4,541,177 | A * | 9/1985 | Hollander | 30/180 |
| 4,802,517 | A * | 2/1989 | Laster | 144/34.5 |
| 4,908,946 | A * | 3/1990 | Labounty | 30/134 |
| 5,142,779 | A * | 9/1992 | LaBounty | 30/134 |

* cited by examiner

*Primary Examiner* — Bena Miller
(74) *Attorney, Agent, or Firm* — Holland & Hart LLP

(57) ABSTRACT

A shear attachment is presented for use with different types of motorized vehicles and is generally provided with an upper cutting jaw, a lower receiving jaw and a plurality of teeth along the upper surface of the lower jaw to grip an object while it is being cut between the upper and lower jaws. A single actuator may be used to move the cutting jaw between open and closed positions. The shear may be pivoted about a horizontal axis with respect to its mounting bracket to facilitate cutting at different angles. The shear is removably coupled to the vehicle using a universal hitch. The efficient design of the shear makes it durable, inexpensive to manufacture and easy to operate.

21 Claims, 7 Drawing Sheets

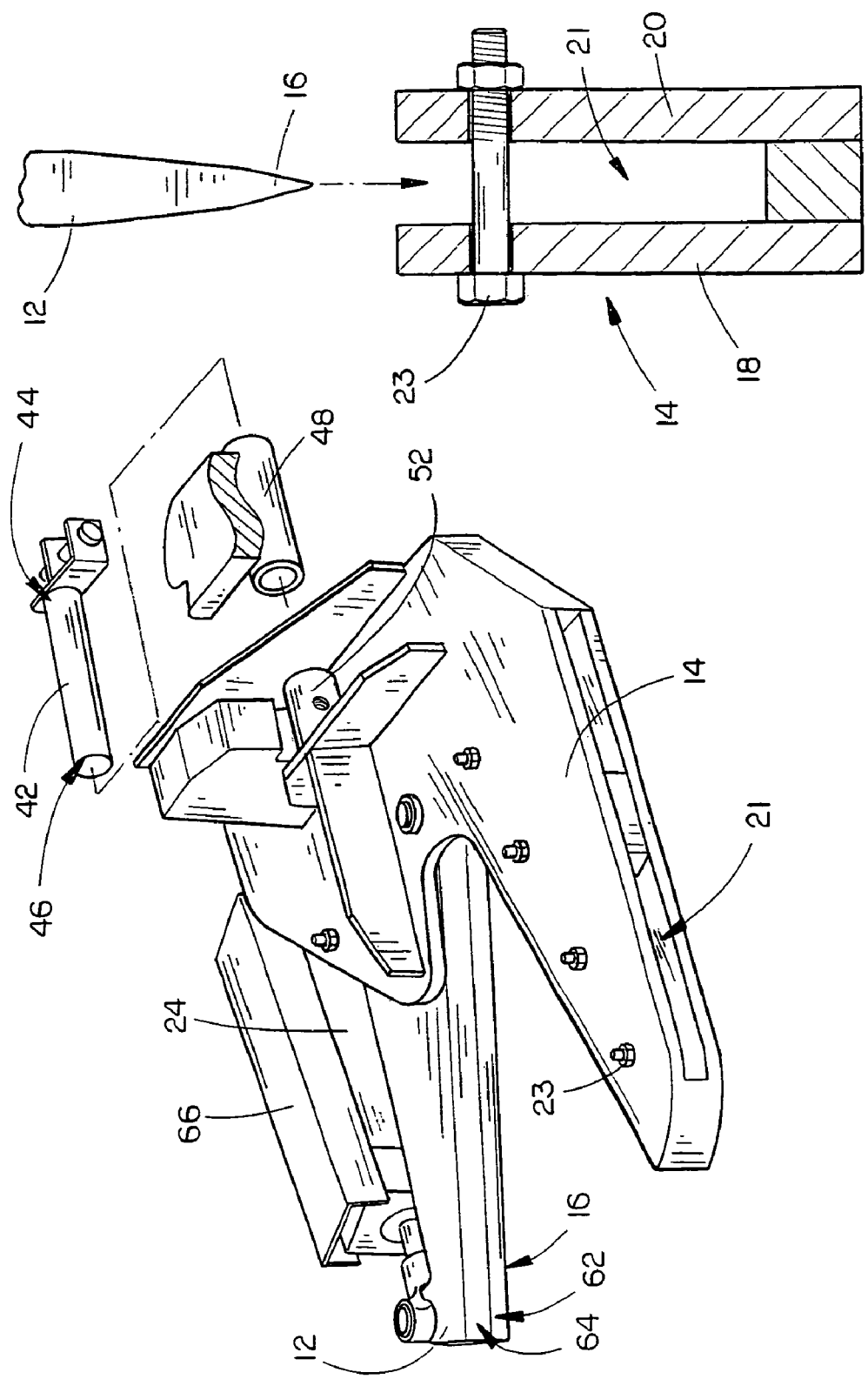

SHEAR ATTACHMENT

CROSS-REFERENCE TO RELATED APPLICATION

This is a continuation-in-part application of Petitioner's earlier application Ser. No. 10/774,740 filed Feb. 9, 2004 now abandoned, entitled SHEAR ATTACHMENT.

BACKGROUND OF THE INVENTION

1. Field of the Invention

The present invention relates to mechanical attachments for front-end loaders and other motorized vehicles. More particularly, the present invention relates to a shear attachment having gripping teeth disposed along a receiving jaw to grip the object being cut by a cutting edge of the shear.

2. Description of the Prior Art

Shears can be provided in a variety of configurations to cut objects having different shapes and sizes. Two of the most common types of shears are one- and two-bladed shears, which have upper and lower jaws that are pivotably coupled to one another so that the jaws move in a scissor-like motion. Anyone who has used these types of shears knows that one serious drawback to the design of pivoting shears is that dense or hardened objects are easily pushed out of the jaws of the shears as the user engages the jaws in a closing or cutting direction. A simple example of this phenomenon occurs when a pair of scissors is used to cut a wooden dowel. As the jaws are closed and the cutting pressure is increased, the dowel simply slides to the forward end of the blades until it is ejected from the scissors, uncut.

Several shear attachments have been developed over the years for use with wheeled vehicles, such as skid loaders, tractors and the like. These shear attachments typically take the form of either a one or two bladed pivoting shear. Accordingly, the same shortcomings experienced by the pair of scissors in cutting the dowel are experienced by a shear attachment being used to delimb or fell a tree. For example, U.S. Pat. No. 4,541,177 discloses a single bladed, pivoting shear attachment for delimbing trees. The shear receives tree branches between a cutting jaw and an anvil receiving frame. Unfortunately, as the cutting jaw engages large tree limbs, it oftentimes pushes the limbs along the anvil frame, rather than cutting them, causing the shear and the motorized vehicle to be pushed away from the tree until the limbs are simply pushed out of the jaws of the shear attachment. Those limbs that are not pushed completely out of the jaws are pushed to the forward end portion of the shear, where the cutting power of the shear is weakest, oftentimes leaving the limbs only partially sheared. To counteract these forces, the operator must set the brakes of the vehicle or engage its drive system to push the vehicle toward the tree as the shear pushes the vehicle away from the tree, of course, such efforts tend to put strain on the vehicle and decrease their level of effectiveness as the vehicle's traction decreases. Moreover, the jaws of the shear attachment are fixed in a vertical orientation, rendering the shear nearly useless to the user who needs to fell a tree or section a felled tree, rather than delimb it.

Other, more complicated, prior art shears have been designed to include hydraulically operated clamping systems that are coupled to the motorized vehicle, adjacent the shear attachment. Such devices are typically operated by first grasping the tree with the clamping system. The user then operates the shear to remove a portion of the tree. Such systems are complex to manufacture and use, which increases the cost of the device and the likelihood of component failure. Moreover, as the operator engages the shear in a cutting motion, the clamping system attempts to overcome the forces caused by the shear. This causes an undesirable tension between the two structures, which can result in a system failure or serious injury to the operator.

Accordingly, what is needed is a shear attachment for use with motorized vehicles that is easily adapted for cutting materials in a plurality of different angles. More importantly, a simple but effective grasping system is needed to help stabilize the shear with respect to the object being cut while the shear is engaged.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

The shear attachment of the present invention is preferably used in combination with front-end loaders and other motorized vehicles. The shear is comprised of an upper cutting jaw and a lower receiving jaw. The upper and lower jaws are pivotally connected to each other at their rearward end portions. The shear is rotatably coupled to a mounting bracket, which is removably coupled to the vehicle. In a preferred embodiment, a plurality of teeth extend upwardly from the upper edge of the lower receiving jaw to grip an object while it is being cut between the upper and lower jaws. An actuator is provided to move the cutting jaw between open and closed positions. The shear is coupled to the mounting bracket so that it may be selectively pivoted about an axis extending generally perpendicular from the mounting bracket.

In operation, the shear of the present invention can be used to cut various objects, comprised of different types of materials, that may be disposed in nearly any position. The shear is particularly well suited for felling, sizing and pruning trees and other brush. The gripping teeth of the lower jaw secure the shear and the object being cut in a stationary position with respect to one another while the object is cut in nearly any angular relationship with respect to the vehicle. Accordingly, available power is directed toward cutting, rather than maintaining the shear and the vehicle in a fixed position with respect to the object being cut.

The shear is preferably manufactured from high-strength plate steel, for strength and durability. However, the simple geometry and construction of the shear make it relatively inexpensive and easy to manufacture. A universal hitch is preferably incorporated to make the shear versatile for quick and easy assembly on a plurality of different vehicle types.

It is therefore a principal object of the invention to provide an improved shear attachment that can be used with different types of motorized vehicles to simply and effectively secure and cut a wide variety of objects.

A further object of the invention is to provide an improved shear attachment that is capable of grasping and cutting objects simultaneously using a single actuator.

Still another object of the invention is to provide an improved shear attachment having an upper cutting jaw, a lower receiving jaw and a plurality of gripping teeth to safely keep the shear and the object being cut in a fixed position with respect to one another.

Yet another object of the invention is to provide an improved shear attachment capable of cutting objects disposed in differed positions and angles with respect to the operating surface.

A further object of the present invention is to provide an improved sheer attachment that is provided with a lower jaw that is comprised of first and second side members, which are laterally spaced from one another to define an open pocket that extends through the lower jaw.

Still another object of the present invention is to provide an improved sheer attachment that is provided with a lower jaw that comprised of first and second side members, which are laterally spaced from one another, and one or more fasteners, that may be tightened and loosened to urge the first and second side members toward one another or permit the first and second side members to move away from one another, respectively.

Yet another object of the invention is to provide an improved shear attachment having a cutting edge that is selectively removable from a jaw of the shear attachment for easy repair or replacement.

A further object of the invention is to provide an improved shear attachment having a jaw and removable cutting edge that are shaped to engage one another in a manner that inhibits transverse movement of the cutting edge with respect to the jaw.

Still another object of the invention is to provide an improved shear attachment with a cutting edge, having at least one multi-beveled side.

Yet another object of the invention is to provide an improved shear attachment having a pivot shaft that is removably coupled with both the shear and a mounting bracket to permit rotational movement between the shear and the mounting bracket.

A further object of the invention is to provide an improved shear attachment that is simple in design and construction.

These and other objects of the present invention will be apparent after consideration of the Detailed Description and Figures herein.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 6 is an isometric view of one embodiment the sheer attachment of the present invention, depicting the lower end portion of an open pocket formed in the lower jaw of the shear;

FIG. 7 is a front, cross-sectional view of the lower jaw pocket of the sheer attachment of FIG. 6;

DESCRIPTION OF THE PREFERRED EMBODIMENT

Figure 1:
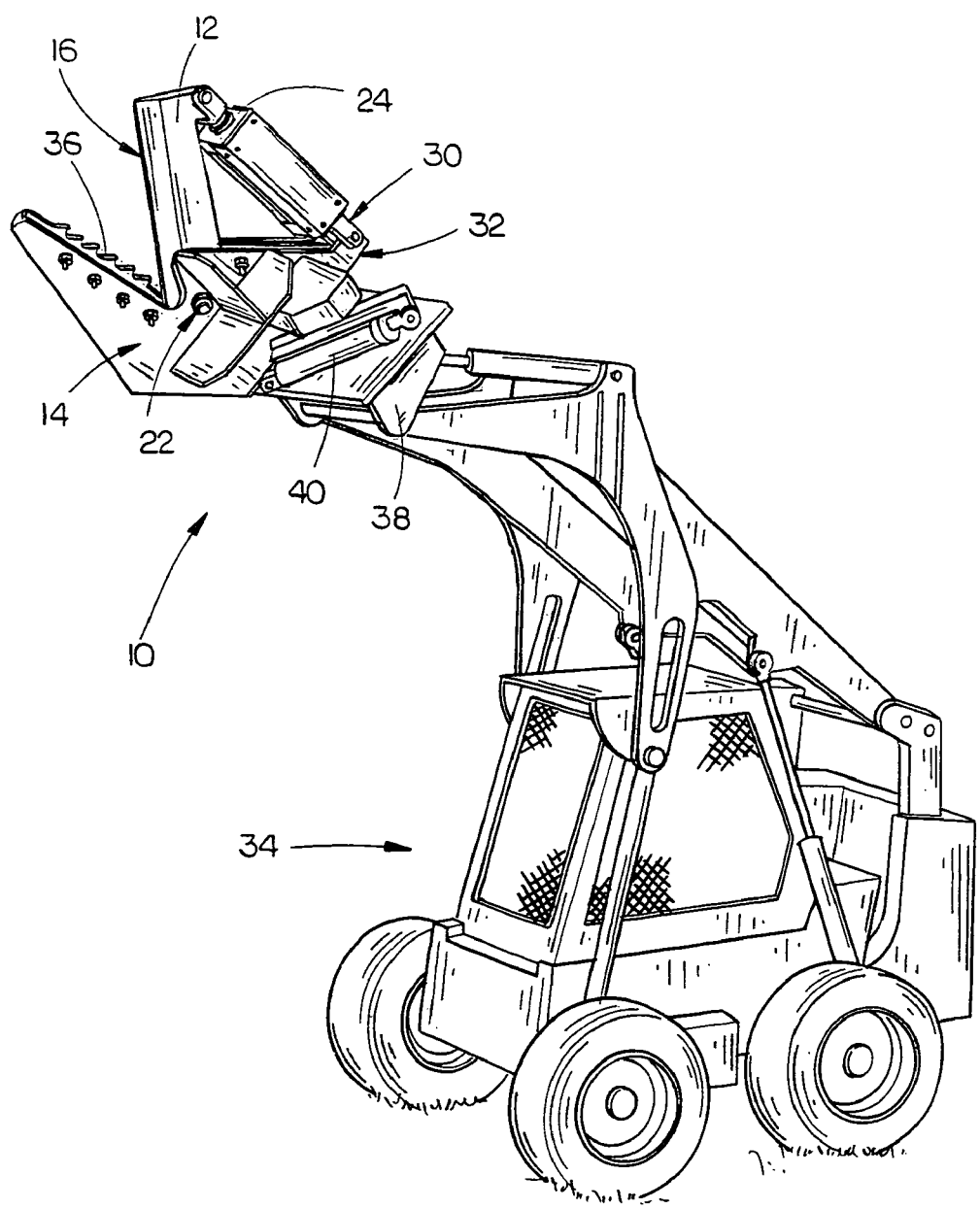
FIG. 1 is a perspective view of one embodiment of the shear attachment of the present invention as the same could be used with a front-end loader.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The numeral 10 refers generally to the shear attachment of the present invention, as the same is generally depicted in FIGS. 1-5. It will be apparent to those skilled in the art that the shear attachment 10 of the present invention is well suited for a plurality of tasks including the felling, sizing and pruning of timber, brush and other vegetation. However it should also be apparent that other non-organic material, such as scrap metal, plastic and the like could be cut using the present invention. It should also be understood that the shear is easily adapted for use as an attachment for a plurality of motorized vehicles, including front-end loaders, skid loaders, tractors, backhoes, excavators and end loaders. However, the examples described herein should not be considered to be limiting, as the uses and applications of the present invention are limited only by the imagination of the user. For simplicity of description, the shear attachment of the present invention will be described as it could be used on skid loaders to fell or prune timber and brush.

As shown in FIGS. 1-5, the shear attachment 10 is generally comprised of an elongated upper jaw 12 and a generally angular lower jaw 14, each having rearward and forward end portions. "Upper" and "lower" are used herein to generally differentiate the jaws 12 and 14 and facilitate the ease of describing the shear attachment 10 only. Due to the variable positioning of the shear attachment 10, "upper" and "lower" are not to be construed as definitive descriptions of the orientation of the jaws 12 and 14 with respect to the horizontal. Upper jaw 12 is shaped to have a cutting edge 16 along its lower side portion. In a preferred embodiment, the lower jaw 14 is comprised of a pair of jaw plates 18 and 20 that are positioned in a spaced relationship with one another to form a pocket 21 for at least partially receiving the cutting edge 16 of upper jaw 12. In a preferred embodiment, the pocket 21 may extend from the upper edge portion of the lower jaw 14 through a lower edge portion of the lower jaw 14 so that debris may be allowed to freely pass through the lower jaw 14. This will produce a distinct advantage over shears that provide a solid surface to contact the cutting edge of the cutting jaw, since such systems frequently clog and fail to provide complete cuts.

The upper and lower jaws are pivotably connected to each other at the rearward ends thereof. While it is contemplated that many pivoting joints known in the art could be used, one preferred assembly comprises a high strength sleeve and shaft assembly 22, which is operatively coupled to the rearward end portions of the upper and lower jaws 12 and 14. Tremendous forces is applied to the jaw plates 18 and 20 that comprise the lower jaw 14 during a cutting operation. These forces will place a tend to urge the jaw plates 18 and 20 apart from one another over time. Accordingly, in one embodiment, one or more fasteners 23, which may be moved between tightened and loosened positions, are transversely disposed through the jaw plates 18 and 20 of the lower jaw 14 in a manner that urges the jaw plates 18 and 20 toward one another, when the one or more fasteners 23 are tightened, and permit the jaw plates 18 and 20 to move away from one another slightly when the one or more fasteners 23 are loosened. In a preferred embodiment, a plurality of fasteners 23 are positioned along a long axis of the lower jaw 14, intermediate the upper and lower edge portions thereof, as depicted in FIGS. 2, 3, 6 and 7. FIG. 7 depicts one position of the fastener 23 that permits the cutting edge of the upper jaw 12 to be partially received within the pocket 21 while still performing its bracing function. It is contemplated that various forms of fasteners could be used, such as the bolts and nuts depicted. It is also contemplated that sleeves may be disposed around the fasteners 23, between the jaw plates 18 and 20, to protect the fasteners 23.

Figure 4:
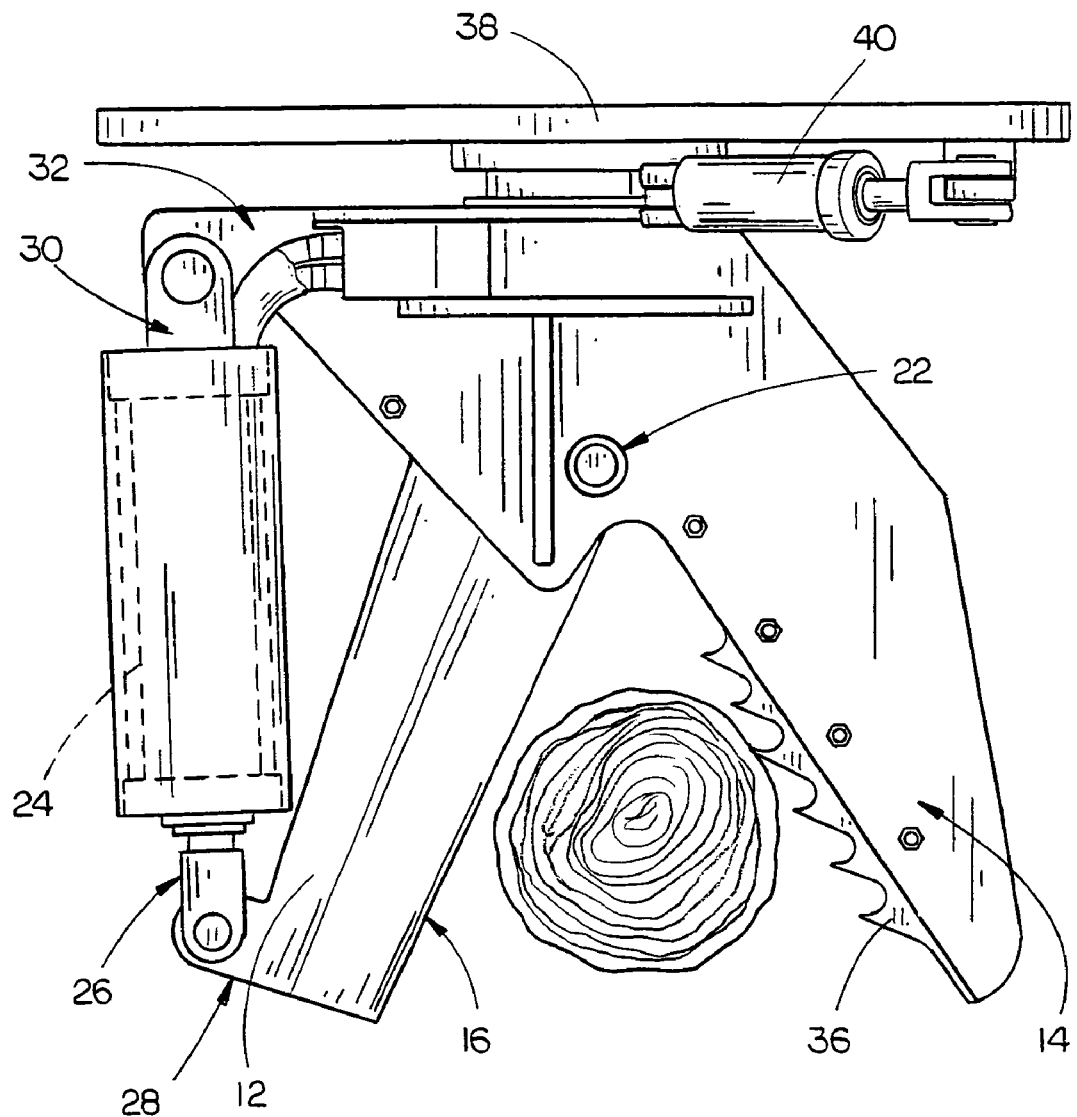
FIG. 4 is a side elevation view of one embodiment of the shear attachment of the present invention as it first receives an object to be cut.
Figure 5:
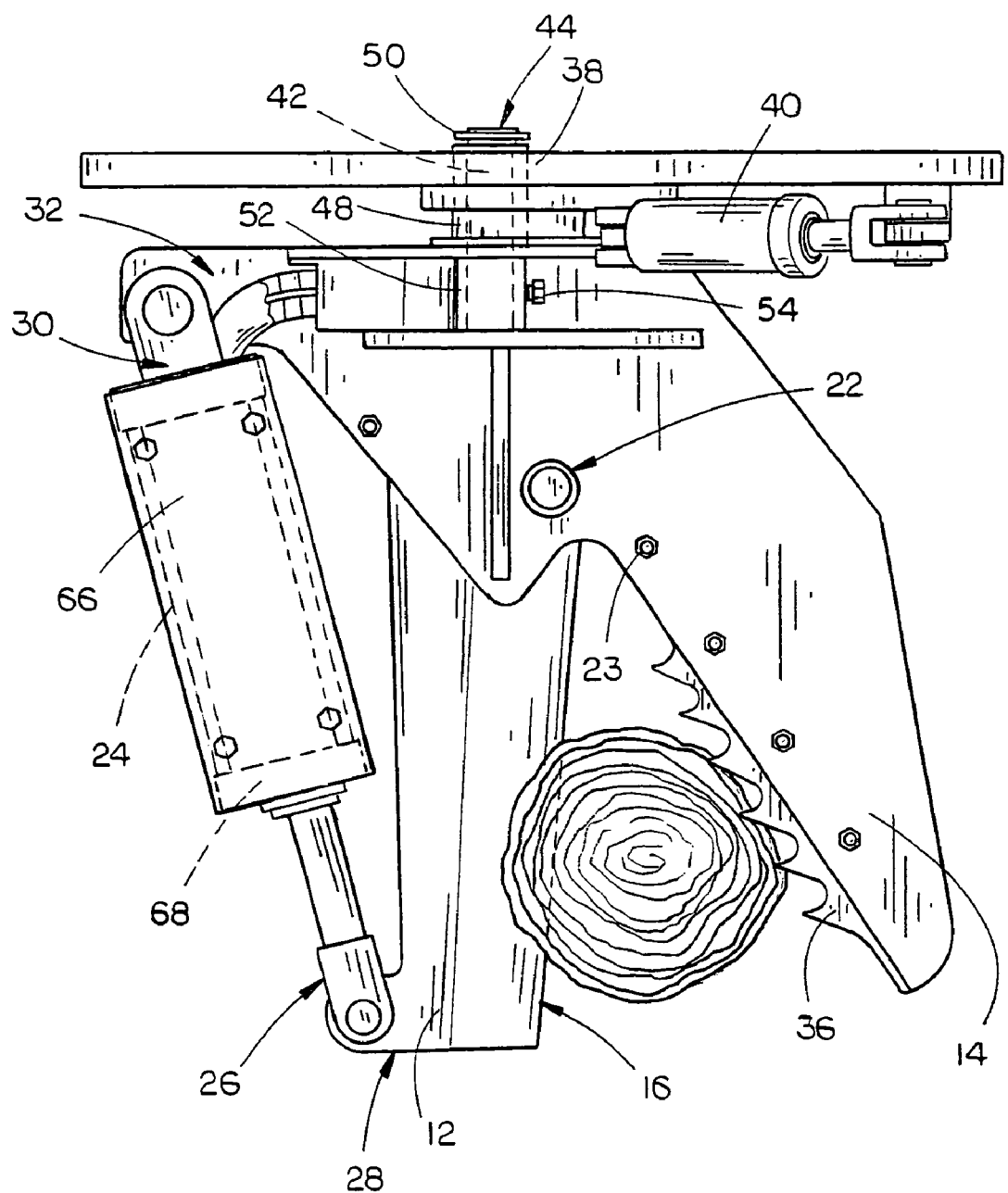
FIG. 5 is a side elevation view of the shear attachment of FIG. 4 demonstrating one manner in which the object can be secured by the jaws of the shear attachment while it is being cut.

A single actuator 24 can be used to move the upper jaw 12 between open and closed positions with respect to the lower jaw 14, as depicted in FIGS. 4 and 5. A first end 26 of the actuator 24 is pivotably connected to the forward end portion 28 of the upper jaw 12. The second end 30 of the actuator 24 is operatively connected to a rearward end portion 32 of the lower jaw 14. The actuator is operatively coupled to the vehicle 34 and the operational controls thereof. Although a plurality of actuators could be used, one actuator provides the shear of the present invention with sufficient cutting force for the contemplated uses of the shear attachment 10. An actuator guard 66 may be provided to protect the actuator 24 from the impact of tree limbs and the like. One or more brackets 68 are secured to the barrel of the actuator 24 to support the actuator guard 66. In a preferred embodiment, the brackets 68 are welded to the barrel of the actuator 24, which is not heretofore performed in the prior art. While welding the brackets 68 to the barrel must be done during the manufacture of the actuator 24 and requires additional machining of the barrel after the brackets 68 are welded thereto, the strength and longevity attained over prior art designs is unparalleled.

Figure 3:
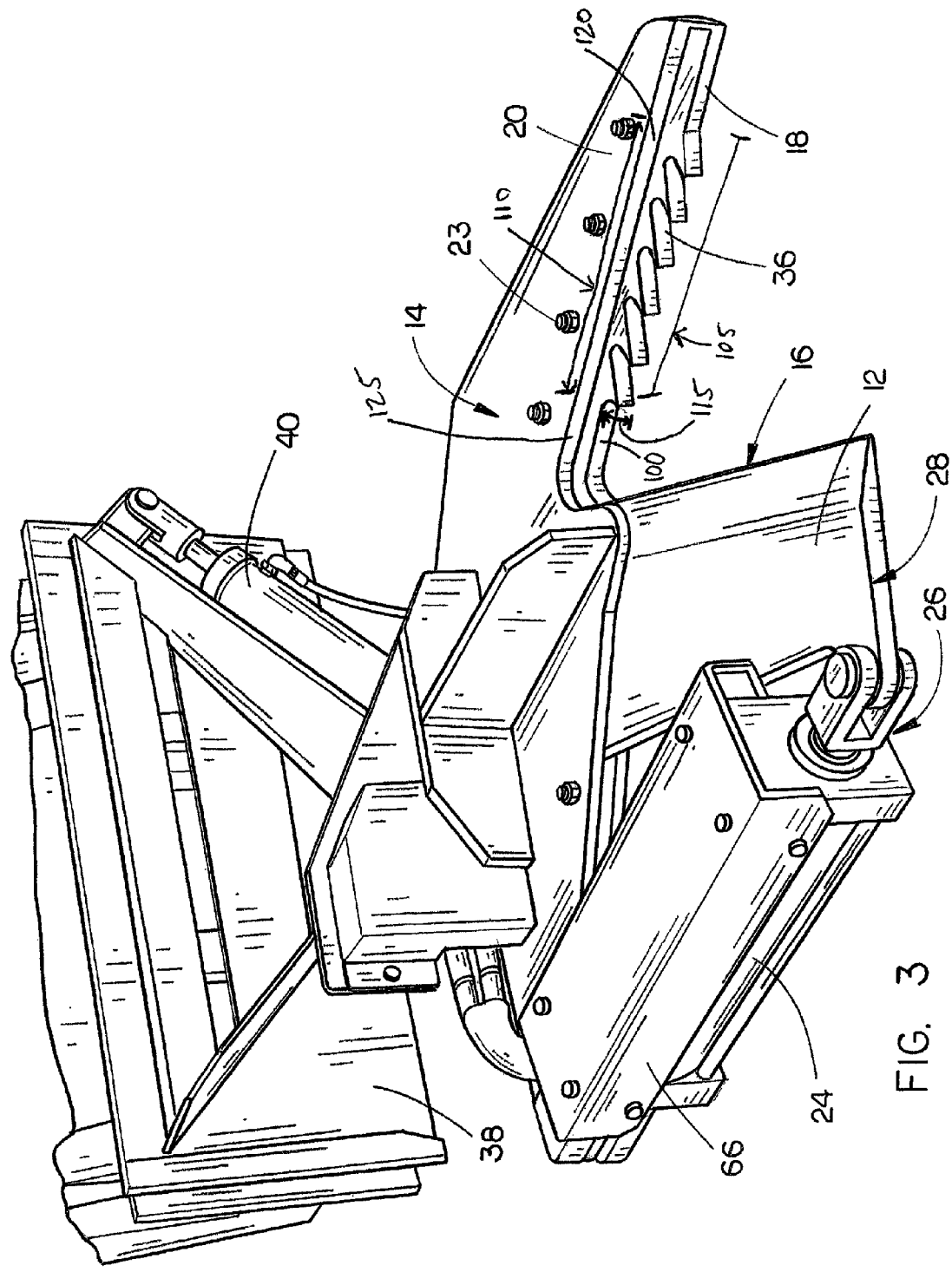
FIG. 3 is an isometric view of the shear attachment of FIG. 1 in a generally horizontal or "felling" position.

In a preferred embodiment, at least one tooth 36 is provided to extend generally upwardly from the upper edge portion of the lower jaw 14. The tooth 36 should be positioned with respect to the forward and rearward end portions of the lower jaw 14 so that an object disposed between the upper jaw 12 and the lower jaw 14 will become at least partially engaged by the tooth 36 as the upper jaw 12 is moved toward its closed position. It is preferred that a plurality of spaced teeth be provided along the upper edge portion of the lower jaw 14 to enhance the gripping ability of the shear attachment 10 along a greater length of the lower jaw 14. As depicted within the figures, it is preferred that the teeth 36 be shaped to have engagement points for at least partially piercing or deforming the object to be cut, such as a tree limb. Preferably, the teeth 36 are positioned to face generally upwardly and rearwardly from the lower jaw 14 (Jorgensen-Style Configuration). This arrangement generally enhances the ability of the teeth 36 to engage and secure the object between the upper jaw 12 and the lower jaw 14. It is contemplated that the teeth 36 could be integrally formed with the lower jaw 14 or separately manufactured and secured thereto. It is further contemplated that the teeth 36 can be arranged to extend generally upwardly from either or both sides of the lower jaw 14. However, positioning the teeth 36 to extend upwardly from jaw plate 18 alone will create a distinct advantage. As depicted in FIG. 3, the shear 10 is in a felling position, whereby the jaw plate 18 is positioned beneath jaw plate 20. Impact of the upper jaw 12 with the material being cut forces the material against the teeth 36. The cutting edge 16 of the upper jaw 12 begins to scissor past the teeth 36, which tends to push the material being cut into an angle in relation to the position of the shear 10. As the cutting edge continues its path through the material, such as a tree, the material will predictably fall in the direction that the upper jaw 12 travels. The ability to know the direction that large objects, such as trees, will tend to fall is a valuable safety feature for the operator and adjacent people and property.

As shown in FIG. 3, the lower jaw 14 preferably has a plurality of teeth 36 extending generally upwardly from the upper edge 100 of the first side member 18. The plurality of teeth 36 extend in the same plane as the first side member 18 and are positioned on a first region 105 defined on the first side member 18. The first region 105 has a corresponding second region 110 defined on the second side member 20 and which is directly opposing the first region 105. The plurality of teeth 36 extend upwardly from the first region 105 such that the plurality of teeth 36 have an apex 115 positioned above an overall height 120 defined by the upper edge 125 of the second region 110. In addition, the second side member 20 including the second region 110 has a planar surface.

The shear attachment 10 is easily attached to a plurality of different motorized vehicles, including front-end loaders, skid loaders, tractors, backhoes, excavators or end loaders, by means of a mounting bracket 38. In order to attach the shear attachment 10 to different vehicles, it is preferred that the mounting bracket 38 be comprised of a universal two-pin, quick-attach hitch. However, it is contemplated that other mounting assemblies would appropriately secure the shear attachment 10 to the vehicle 34. Such mounting bracket assemblies typically operate with one or more actuators on the vehicle 34 to pitch the mounting bracket 38 up and down with respect to the operating surface.

Figure 2:
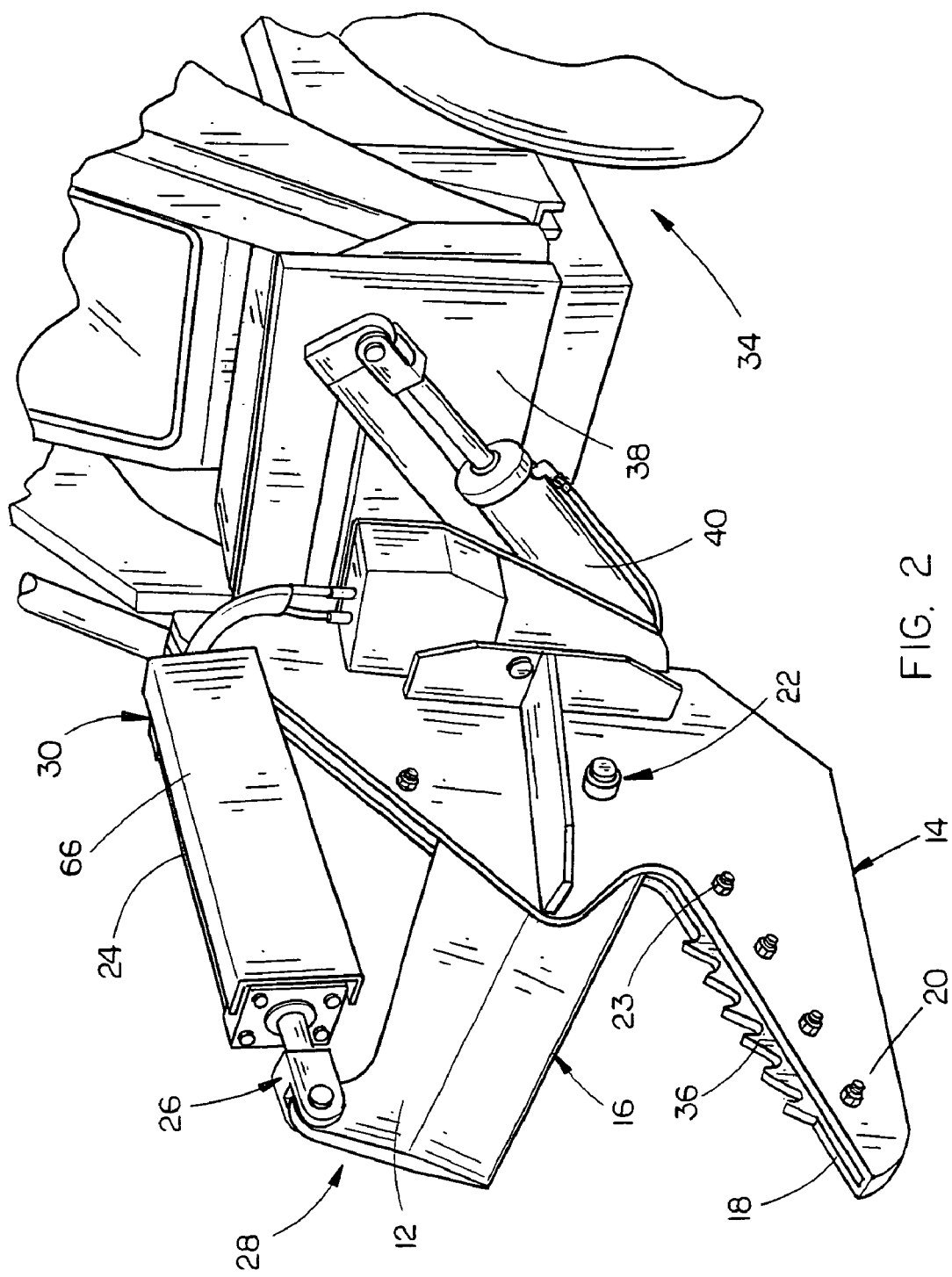
FIG. 2 is an isometric view of the shear attachment of FIG. 1 in a generally vertical or "delimbing" position.

In a preferred embodiment, the rearward end portion of the lower jaw 14 is coupled to the mounting bracket 38 so that it may be selectively rotated about an axis extending generally perpendicularly from the mounting bracket 38. In this manner, the shear can be rotated so that it may be operated in a generally horizontal position, as depicted in FIG. 3, or a generally vertical position, as generally depicted in FIG. 2. It is contemplated that the shear can be pivoted to nearly any degree of rotation to accommodate the circumstances presented in a cutting operation. At least one actuator 40 couples the rearward end portion of the lower jaw 14 to the mounting bracket 38 to assist the operator in rotation of the shear.

In a preferred embodiment, the pivotable engagement between the lower jaw 14 and the mounting bracket 38 is attained through the use of a pivot shaft 42, having a first end portion 44 and a second end portion 46. In one embodiment, the pivot shaft 42 is removably coupled with each of said shear and said mounting bracket. Typical prior art designs weld one or both end portions of the pivot shaft with the shear attachment and/or the mounting bracket. However, forces inflicted on the shaft during certain operations have a tendency to break pivot shafts that are permanently secured to the attachment and/or the mounting bracket. In one embodiment, a pivot sleeve 48 is secured to the mounting bracket 38. The pivot shaft 42 is rotatably disposed within the pivot sleeve 48 so that the first end portion 44 and second end portion 46 of the pivot shaft 42 extend outwardly from opposite end portions of the pivot sleeve 48. The first end portion 44 of the pivot shaft 42 is preferably provided with a removable retaining member 50 to prevent withdrawal of the first end portion 44 of the pivot shaft 42 through the pivot sleeve 48. A mounting sleeve 52 may be secured to the shear, at or near the lower jaw 14 and at least partially receive the second end portion 46 of the pivot shaft 42. At least one mounting fastener 54 may be removably passed through the mounting sleeve 52 to engage the second end portion 46 of the pivot shaft 42 to substantially prevent relative movement between the mounting sleeve 52 and the pivot shaft 42.

Figure 9:
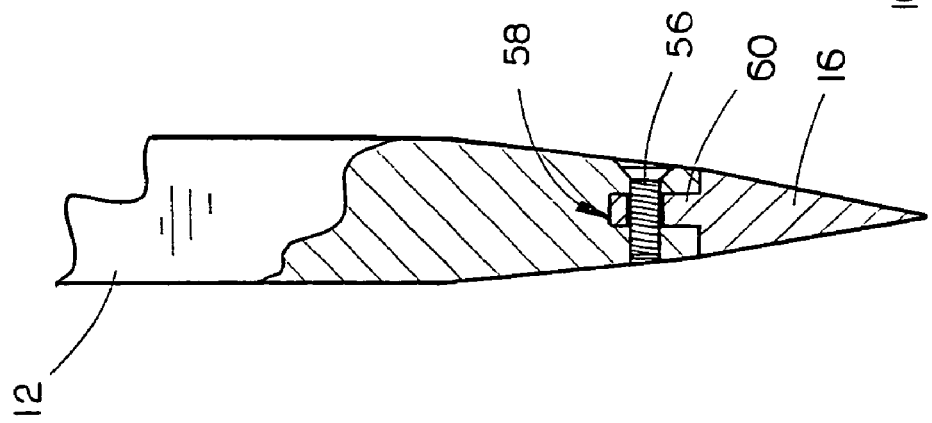
FIG. 9 is a partial, cut-away end view of the sheer attachment blade of FIG. 8.
Figure 8:
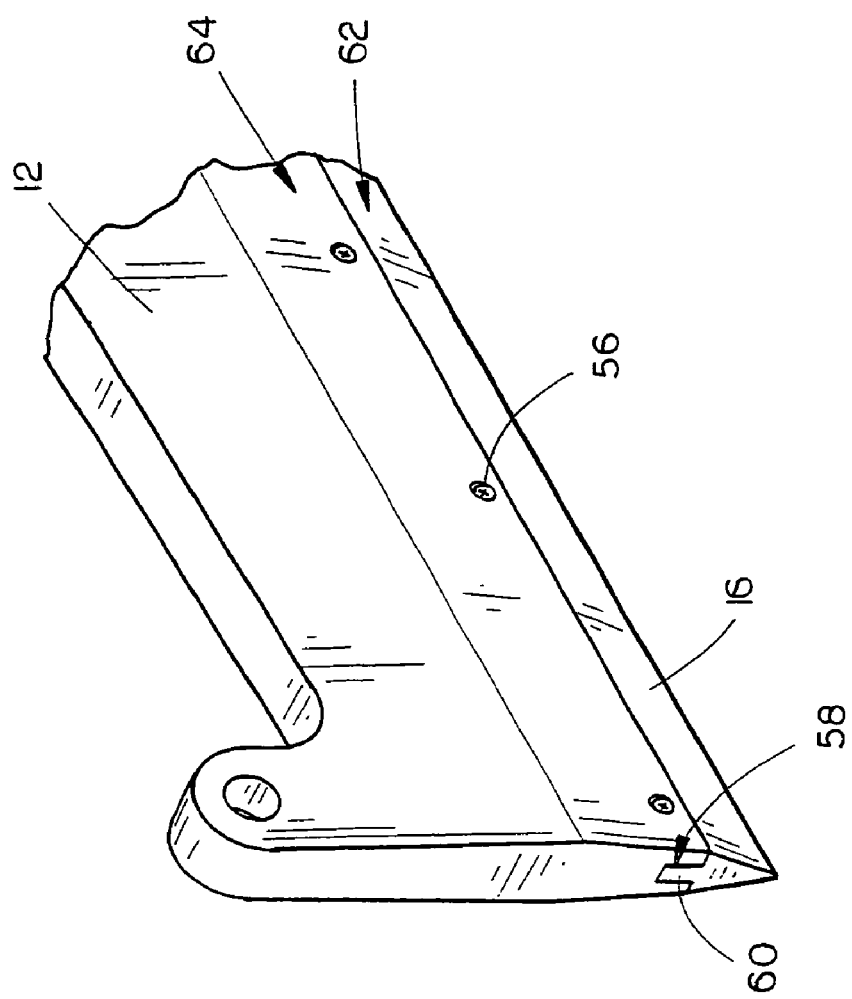
FIG. 8 is a partial isometric view of an alternate embodiment of the sheer attachment blade.

As depicted in FIGS. 8 and 9, the cutting edge 16 of the upper jaw 12 may be removably coupled with the lower side portion of the upper jaw 12 to enable fast and easy repair or replacement of the same. A removable cutting edge 16 will further allow for the user to exchange one type of cutting edge, for cutting one particular type of material such as trees, for another type of cutting edge that is configured for cutting another material, such as rubber tires. One or more edge fasteners 56 may be used to removably secure the cutting edge 16 to the lower side portion of the upper jaw 12. It may be preferred, however, to provide the lower side portion of the upper jaw 12 with a channel 58 that is shaped to releasably receive a tongue 60 extending from a backside of the cutting edge 16. While the channel 58 and tongue 60 depicted in FIGS. 8 and 9 are relatively elongated and rectangular in shape, it is contemplated that they may be provided with nearly any interlocking shapes desired, such as a dovetail, that will substantially prevent movement of the cutting edge 16 in a transverse direction with respect to the lower edge portion of the upper jaw 12. While they may be used separately, the edge fasteners 56, channel 58 and tongue 60 may be used simultaneously to provide a strong, releasable engagement between the cutting edge 16 and the upper jaw 12.

Figure 10:
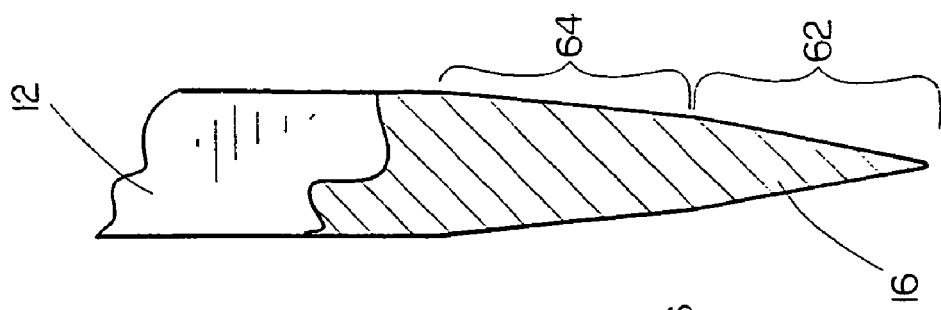
FIG. 10 is a partial, cut-away end view of an alternate embodiment of the sheer attachment blade, having a multi-beveled edge portion.

Regardless of whether the cutting edge 16 is removably or permanently coupled with the upper jaw 12, it is contemplated that it may be desirable to provide the cutting edge 16 in a variety of configurations. For example, the cutting edge 16 may be shaped to have a plurality of bevels on one or both sides of the cutting edge 16. As depicted in FIG. 10, a first bevel 62 may be formed to extend rearwardly from the tip of the cutting edge 16. A second bevel 64 my be formed to extend rearwardly from the first bevel 62. This design creates a more durable cutting edge as most single bevel designs will tend to roll the edge cutting edge over time. The second bevel is formed at an angle that is more acute that the first bevel 62, which induces less friction along the second bevel 64 as the cutting edge passes though the material being cut.

The central components of the shear attachment 10, such as the upper and lower jaws 12 and 14, can be manufactured from numerous materials that are durable and have sufficient strength for the contemplated uses. One preferred embodiment of the shear attachment 10 is constructed from high-strength steel, such as ASTM-A-572 Grade 50 High Tensile Plate, or its approximate equivalent. The plate steel provides benefits beyond that of strength. The plate steel provides ease of manufacture. The upper and lower jaws 12 and 14, mounting brackets and bracing members can all be cut from a single plate of steel, without the need of further processing and manufacture. Accordingly, the total cost of manufacture can be decreased. Moreover, the plate steel permits the cutting edge 16 of the upper jaw to be easily formed through flame cutting or similar process and then ground to provide an optimum cutting edge. In the event the cutting edge is blemished during future use, it can be easily sharpened on location with a simple hand grinder.

In operation the shear attachment 10 of the present invention can be used to cut irregularly shaped objects comprised of a wide range of materials. The shear 10 is particularly well suited for felling, sizing and pruning trees and brush. For example, the operator can position the lower shear attachment 10 closely adjacent limb of a tree at nearly any angle and at various heights above ground. As the upper and lower jaws 12 and 14, the gripping teeth substantially prevent the shear attachment 10 and the vehicle 34 from being pushed away from the tree as the limb is severed by the cutting edge 16. Accordingly, the available power of the system is directed at cutting and not wasted on maintaining the position of the shear attachment 10 and the vehicle 34 with respect to the tree. This can be particularly helpful when the ground is wet, muddy or icy.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

What is claimed is:

1. In combination:
a motorized vehicle; and
a shear, comprising:
an upper jaw having forward and rearward end portions, upper and lower side portions, and a cutting edge formed at least partially along said lower side portion;
a lower jaw having forward and rearward end portions; said rearward end portion of said lower jaw being operatively pivotably coupled to the rearward end portion of said upper jaw so that said shear may be selectively moved between open and closed positions; said lower jaw being comprised of first and second side members that are laterally spaced from one another to define an open pocket that is shaped and sized to receive at least a portion of the cutting edge of said upper jaw when said shear is in said closed position, each of said first and second side members having separately defined upper edges;
at least one actuator operatively coupled with said upper and lower jaws to selectively move said shear between said open and closed positions;
said lower jaw having a plurality of teeth extending generally upwardly from said upper edge of said first side member of said lower jaw and extending in a same plane as the first side member, the plurality of teeth being positioned on a first region defined by the first side member and wherein the first region has a corresponding second region defined by the second side member that is directly opposing said first region, the plurality of teeth extending upwardly such that the plurality of teeth on the first side member have an apex positioned above an overall height defined by the upper edge of the second region defined by the second side member, wherein the second side member including the second region has a planar surface, and wherein said plurality of teeth are defined to engage one or more objects disposed between said upper and lower jaws when said shear is moved from said open position toward said closed position, wherein when the shear is moved towards the closed position, the plurality of teeth having an apex greater then the upper edge on the second region defined by the second side member has a tendency to cause the one or more objects to move towards the second region; and
a mounting bracket operatively coupling said shear with said motorized vehicle.

2. The combination of claim 1 wherein said plurality of teeth are shaped to have engagement points, for at least partially piercing said one or more objects, that are positioned to face generally upwardly and rearwardly from said lower jaw.

3. The combination of claim 1 wherein said shear is operatively coupled to said mounting bracket so that said shear may be selectively pivoted about a rotational axis that extends generally perpendicularly from said mounting bracket.

4. The combination of claim 3 further comprising at least one actuator operatively coupled to said shear to selectively pivot said shear about said rotational axis.

5. A method of using the combination of claim 3 to fell a tree, comprising the steps of:
   (a) positioning said shear to be generally horizontal and so that said upper jaw may be moved to said closed position in a right-to-left manner;
   (b) maneuvering said motorized vehicle so that said shear is positioned closely adjacent the tree, such that the tree is positioned at least partially between said upper jaw and said lower jaw; and
   (c) operating said at least one actuator so that said shear is moved from said open position to said closed position, such that the tree is at least partially cut by said shear.

6. The combination of claim 1 further comprising at least one fastener, which may be moved between tightened and loosened positions, transversely disposed through the first and second side members of said lower jaw in a manner that urges said first and second side members toward one another when said at least one fastener is tightened and permit the first and second side members to move away from one another when said at least one fastener is loosened.

7. The combination of claim 6 wherein the open pocket in said lower jaw at least partially extends from the upper edges of the first and second side members of said lower jaw through a lower edge portion of said lower jaw so that debris may be allowed to freely pass through said lower jaw.

8. The combination of claim 6 wherein said at least one fastener is provided as a plurality of fasteners, which may be moved between tightened and loosened positions.

9. The combination of claim 8 wherein each of said plurality of fasteners is comprised of a bolt and a nut.

10. The combination of claim 8 wherein said plurality of fasteners are positioned to substantially prevent the first and second side members of said lower jaw from moving away from one another when the shear is in use.

11. The combination of claim 1 wherein the cutting edge of said upper jaw is operatively, removably coupled with the lower side portion of said upper jaw.

12. The combination of claim 11 further comprising at least one fastener that removably secures the cutting edge to the lower side portion of said upper jaw.

13. The combination of claim 11 wherein the lower side portion of said upper jaw is provided with a channel that is shaped to releasably receive a tongue extending from a backside of said cutting edge.

14. The combination of claim 13 wherein said channel and said tongue are shaped to mate with one another and to substantially prevent movement of said cutting edge in a transverse direction with respect to the lower edge portion of said upper jaw.

15. The combination of claim 14 further comprising at least one fastener that removably secures the cutting edge to the lower side portion of said upper jaw.

16. The combination of claim 1 wherein the cutting edge of said upper jaw is shaped to have generally opposite sides and at least one of said sides is shaped to have a plurality of bevels.

17. The combination of claim 1 wherein at least one guard bracket is welded to said at least one actuator and an actuator guard is operatively coupled with said at least one bracket.

18. The combination of claim 1 wherein said shear is operatively coupled with said mounting bracket using a pivot shaft, having opposite first and second end portions; said pivot shaft being removably coupled with each of said shear and said mounting bracket.

19. The combination of claim 18 further comprising a pivot sleeve operatively coupled with said mounting bracket; said pivot shaft being rotatably disposed within said pivot sleeve so that the first and second end portions of said pivot shaft extend outwardly from opposite end portions of said pivot sleeve; said first end portion of said pivot shaft being provided with a removable retaining member to prevent withdrawal of the first end portion of said pivot shaft through said pivot sleeve.

20. The combination of claim 19 further comprising a mounting sleeve operatively coupled with said shear; said second end portion of said pivot shaft being at least partially disposed within said mounting sleeve.

21. The combination of claim 20 further comprising at least one mounting fastener that is removably passed through said mounting sleeve to engage the second end portion of said pivot shaft and substantially prevent relative movement between said mounting sleeve and said pivot shaft.

* * * * *